(12) United States Patent
Trasorras et al.

(10) Patent No.: US 7,534,391 B2
(45) Date of Patent: May 19, 2009

(54) POWDER METAL CLUTCH RACES FOR ONE-WAY CLUTCHES AND METHOD OF MANUFACTURE

(75) Inventors: Juan R. L. Trasorras, Ann Arbor, MI (US); Salvator Nigarura, Centerville, OH (US)

(73) Assignee: PMG Indiana Corp., Columbus, IN (US)

( * ) Notice: Subject to any disclaimer, the term of this patent is extended or adjusted under 35 U.S.C. 154(b) by 414 days.

(21) Appl. No.: 11/518,650

(22) Filed: Sep. 11, 2006

(65) Prior Publication Data

US 2007/0081915 A1 Apr. 12, 2007

Related U.S. Application Data

(62) Division of application No. 10/261,724, filed on Oct. 1, 2002, now Pat. No. 7,160,351.

(51) Int. Cl.
*B22F 3/24* (2006.01)
(52) U.S. Cl. .......................................... 419/28; 75/246
(58) Field of Classification Search .................. 419/28; 75/246

See application file for complete search history.

(56) References Cited

U.S. PATENT DOCUMENTS

| 175,807 | A | 4/1876 | Wistar |
| 2,542,912 | A | 2/1951 | Ensign |
| 3,772,935 | A | 11/1973 | Dunn et al. |
| 3,851,512 | A | 12/1974 | Zhuraviev et al. |
| 3,874,049 | A | 4/1975 | Ferguson |
| 3,951,561 | A | 4/1976 | Speakman |
| 3,992,763 | A | 11/1976 | Haynie et al. |
| 4,002,471 | A | 1/1977 | Sarnes et al. |
| 4,059,879 | A | 11/1977 | Chmura et al. |
| 4,069,044 | A | 1/1978 | Mocarski et al. |
| 4,111,031 | A | 9/1978 | Vennemeyer et al. |
| 4,232,436 | A | 11/1980 | Chmura et al. |
| 4,253,874 | A | 3/1981 | Cundill |
| 4,398,407 | A | 8/1983 | DeFay, Jr. |
| 4,573,841 | A | 3/1986 | Petkov et al. |

(Continued)

OTHER PUBLICATIONS

Robert J. Fanella, "Roller One-Way Clutches", Design Practices, Passenger Car Automatic Transmissions, pp. 441-467, AE-18, SAE Warrendale, PA 15096-0001.

(Continued)

*Primary Examiner*—Roy King
*Assistant Examiner*—Weiping Zhu
(74) *Attorney, Agent, or Firm*—Metz Lewis LLC; Barry I. Friedman

(57) ABSTRACT

A method of fabricating clutch races for one-way clutch mechanisms includes compacting and sintering a ferrous-based powder metal to near-net shape to produce a core density of between about 6.8 to 7.6 g/cc and a race surface that is near-net shape. The cam surface is cold worked in a manner that locally increases the density at the surface to develop a highly densified layer of essentially fully densified material and with a final surface finish that, after heat treatment, is ready to use in a one-way clutch application without further working. Both the inner and outer clutch races of one-way clutch mechanisms can be formed in this fashion and yield races that exhibit excellent strength, toughness, fatigue strength and wear resistance.

14 Claims, 9 Drawing Sheets

U.S. PATENT DOCUMENTS

| | | |
|---|---|---|
| 4,651,926 A | 3/1987 | Sasao et al. |
| 4,693,864 A | 9/1987 | Lloyd |
| 4,727,744 A | 3/1988 | Ferre |
| 4,771,627 A | 9/1988 | Speakman |
| 4,940,565 A | 7/1990 | Muller |
| 4,954,171 A | 9/1990 | Takajo et al. |
| 5,009,842 A | 4/1991 | Hendrickson et al. |
| 5,069,869 A | 12/1991 | Nicolas et al. |
| 5,233,738 A | 8/1993 | Finkbeiner et al. |
| 5,325,698 A | 7/1994 | Nagpal et al. |
| 5,368,629 A | 11/1994 | Kondo et al. |
| 5,390,414 A | 2/1995 | Lisowsky |
| 5,403,544 A | 4/1995 | Adrian et al. |
| 5,409,662 A | 4/1995 | Hirai |
| 5,427,600 A | 6/1995 | Itoh et al. |
| 5,453,242 A | 9/1995 | Knoess |
| 5,503,506 A | 4/1996 | Yuan |
| 5,613,180 A | 3/1997 | Kosco |
| 5,659,955 A | 8/1997 | Plamper |
| 5,729,822 A | 3/1998 | Shivanath et al. |
| 5,740,516 A | 4/1998 | Jiranek |
| 5,764,051 A | 6/1998 | Tajima et al. |
| 5,853,073 A | 12/1998 | Costin |
| 5,947,245 A | 9/1999 | Costin et al. |
| 5,966,581 A | 10/1999 | Pederson et al. |
| 5,972,132 A | 10/1999 | Cadle |
| 6,017,489 A | 1/2000 | Woolf et al. |
| 6,062,362 A | 5/2000 | Costin et al. |
| 6,151,778 A | 11/2000 | Woolf et al. |
| 6,151,941 A | 11/2000 | Woolf et al. |
| 6,168,754 B1 | 1/2001 | Woolf et al. |
| 6,182,808 B1 | 2/2001 | Walton et al. |
| 6,193,038 B1 | 2/2001 | Scott et al. |
| 6,261,389 B1 | 7/2001 | Nakamura et al. |
| 6,338,403 B1 | 1/2002 | Costin et al. |
| 6,579,492 B2 | 6/2003 | Wehler |
| 6,632,263 B1 | 10/2003 | Nigarura et al. |
| 6,670,048 B2 | 12/2003 | Fujiwara |
| 2003/0033904 A1 | 2/2003 | Ilia |
| 2004/0003976 A1 | 1/2004 | Pederson et al. |

OTHER PUBLICATIONS

Robert J. Fanella, "Sprang One-Way Clutches", Design Practices, Passenger Car Automatic Transmissions, pp. 469-482, AE-18, SAE Warrendale, PA 15096-0001.

W. Brian James, Michael J. McDermott and Robert A. Powell, "Powder Forged Steel", ASM Handbook, vol. 7, Powder Metal Technologies and Applications, ASM 1998, pp. 803-827.

Douglas Glover, "A Ball-Rod Rolling Contact Fatigue Tester", Rolling Contact Fatigue Testing of Bearing Steels, ASTM STP 771, J.J.C. Hoo, ASTM 1982, pp. 107-124.

P.K. Jones, K. Buckley-Golder, D. Sarafinchan, "Developing P/M Gear Tooth and Bearing Surfaces for High Stress Applications", Stackpole Limited, Mississauga, Ontario, Canada pp. 833-843, 1997.

ASM Handbook, vol. 7, Powder Metallurgy, pp. 360-362, 370-373, 1984.

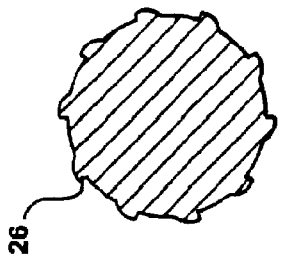
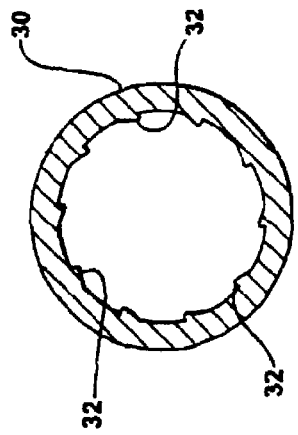
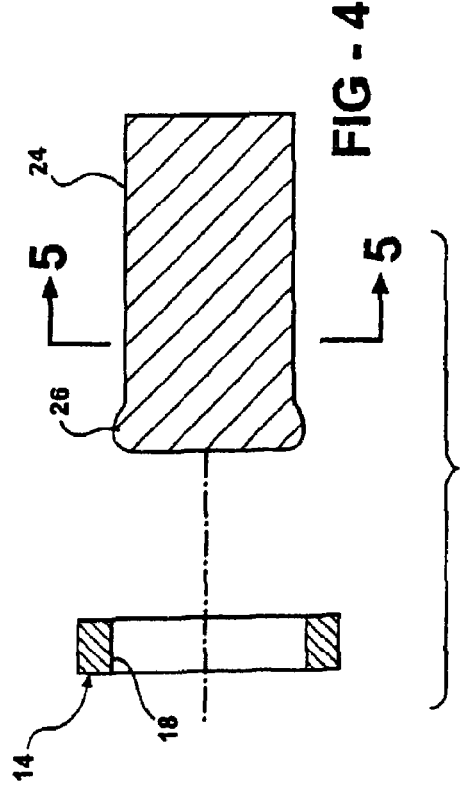
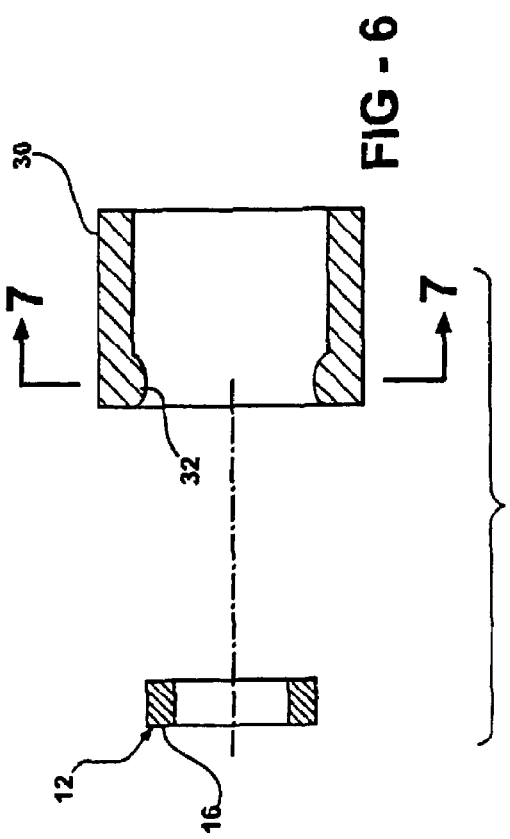

POWDER METAL CLUTCH RACES FOR ONE-WAY CLUTCHES AND METHOD OF MANUFACTURE

CROSS REFERENCE TO RELATED APPLICATION

This application is a divisional of the U.S. application Ser. No. 10/261,724, filed Oct. 1, 2002 and patented on Jan. 9, 2007, U.S. Pat. No. 7,160,351 B2.

BACKGROUND OF THE INVENTION

1. Technical Field

This invention relates generally to one-way clutches, and more particularly to the manufacture of the races for such clutches.

2. Related Art

The fundamental operating principle of one-way clutches is well known to those of ordinary skill in the art. Relative rotation of inner and outer elements is prevented in one direction, enabling the transmission of torque across the clutch, while inner and outer elements can overrun or freewheel in the opposite direction. Nearly all modern passenger car automatic transmissions use one or more one-way clutches to smooth transitions from one torque path to another as the transmission shifts through its operating ranges. Also known as overrunning clutches or freewheels, the most common one-way clutch types are:
1) Roller one-way clutch
2) Sprag one-way clutch
3) Ratchet one-way clutch The roller and sprag types have been in production since the early 1950's. Production of ratchet clutches started in the mid 1990's. All of these one-way clutch assemblies work satisfactorily depending upon the particular application in which they are used. The basic construction of all these clutches includes an outer race, an inner race, a set of locking elements (rollers, sprags or pawls) that can interlock the races, and springs that activate the locking elements.

Initially, races for roller and sprag one-way clutches were manufactured from wrought steels following traditional machining methods (turning, broaching etc.). This process remains in production today. Typical steels used are SAE 1060, SAE 5060, SAE 5120, SAE 5130 and SAE 5160. In order to develop the necessary contact fatigue strength at the race surface and tensile fatigue strength in the bulk of the race, the parts are typically heat treated to HRC 55-60 on the surface and HRC 25-32 in the core.

A major improvement to the manufacturing of races was introduced in U.S. Pat. No. 3,772,935. The disclosed process involves compacting and sintering powder metal into a preform blank and then hot forging the preform to shape the component to yield a full, uniform density throughout the race. Finally, the races are heat-treated. The key advantage of the powder forging process is that it reduces machining. Improvements to the heat treatment step of this process are shown in U.S. Pat. Nos. 3,992,763 and 4,002,471.

An alternative powder forging process is discussed in U.S. Pat. No. 5,966,581. The compacted and sintered preform is worked with a roller-burnishing tool prior to the forging step. The roller burnishing process coupled with the forging is said to increase the fatigue life of the final hot forged, fully densified clutch race.

Another alternative discussed in U.S. Pat. No. 5,966,581 is to cold work the compacted and sintered preform by blasting the surface with glass beads or sand which works the surfaces, followed by hot forging of the preform. This approach results in a comparably rough surface finish than that attained by roller burnishing.

Accordingly, while it is recognized in the art to fabricate races of one-way clutch mechanisms from powder metal that has been compacted and sintered into a preform blank which is roller burnished and then hot forged to yield a fully densified component of desired shape, the art teaches against the possibility of fabricating a net-shape compacted and sintered powder metal clutch race component whose final surface is cold worked that would have suitable mechanical properties and surface finish for its intended use.

It is an object of the present invention to advance the art by improving the processing of one-way clutch races made of powder metal.

SUMMARY OF THE INVENTION AND ADVANTAGES

A method of fabricating powder metal one-way clutch races according to the invention comprises preparing a sintered ferrous-based powder metal which is processed to near-net shape to yield a one-way clutch race component having a core density of between about 7.0 and 7.6 g/cc and a race surface. The race surface is then cold worked to form a layer having a density exceeding that of the core density and a net shape surface finish. The invention further contemplates a clutch race component having such characteristics.

The invention has the advantage of providing a simple process of fabricating one-way clutch race components to achieve excellent mechanical properties as well as an acceptable cam surface finish that is cold worked.

The invention has the further advantage of producing such one-way clutch race components having a variable density with relatively high, but not fully dense core, coupled with a skin or layer at the cam surface which is cold worked to a greater density to provide the required mechanical properties and net shape surface finish on the race surface. The variable density produces a one-way clutch race that exhibits excellent strength, fatigue resistance and wear resistance without having to forge the component to achieve the desired strength and wear resistance. Avoiding the requirements of hot forging simplifies the manufacture and reduces the cost of cam races for one-way clutches. Those of ordinary skill in the art accept that the cost of manufacturing a powder forged component is 1.5 to 2.0 times the cost of manufacturing the component by pressing and sintering. The additional costs are associated with the forging step and the relatively short life of hot forging tools.

Eliminating the forging step has the additional advantage of tightening the overall dimensional tolerances of a component from the range that is typical for powder forged parts to the range that is typical of pressed and sintered parts. Furthermore, the cold worked surfaces have even tighter tolerances.

Another benefit of eliminating the forging step is that the press and sinter process has the ability to produce net-shape geometric features (bosses, oil channels, steps, etc.) that are far more complex than those achievable by forgings, thus greatly reducing the need for secondary machining.

In the case of net-shape race surfaces, like those used for cams for roller one-way clutches, the cold forming processing of the race surface, as described in the present invention, introduces a substantial improvement to the race surface finish. Table 1 summarizes the surface finish that are typical of broaching, powder forging, powder forging as modified per U.S. Pat. No. 5,966,581 and by the present invention.

TABLE 1

Typical surface finish of for a roller one-way
clutch cams produced by broaching, powder forging
and according to the present invention.

| Surface Finish | Broaching | Powder Forging | Powder forging modified per U.S. Pat. No. 5,966,581 | This Invention |
|---|---|---|---|---|
| Ra [μm] | 1-3 | 2-3.2 | 0.9-1.0 | 0.7-0.8 |
| Ra [μinch] | 40-120 | 77-127 | 35-41 | 27-30 |

This surface finish improvement results in superior contact fatigue (spalling) resistance of the clutch race that in turn results in a higher torque capacity for a given clutch.

Eliminating the need for the forging step results in a bearing race material of superior metallurgical quality. It is well known that the there are two detrimental effects associated with the hot powder forging process. First, because the steel preform is heated to a temperature of 1000-1130° C. and exposed the air during the forging process, oxides form on the surface of the part. These oxides appear on the surface and are also entrapped as inclusions to a typical depth of 0.1-0.2 mm. Second, as the preform flows and contacts the die, the material at the surface is rapidly cooled. This cooling results in a fast increase of the yield strength of the material that is detrimental to the collapse of the porosity. Consequently, powder forgings present porosity at the surface to a depth of approximately 0.2-0.4 mm. These microstructural defects, oxides and porosity, have a detrimental impact on the contact fatigue strength of the race. By eliminating the hot forging step and introducing a cold forming operation as proposed in this invention, a race surface of outstanding quality is obtained, with virtually no porosity and oxide inclusions (i.e., essentially zero) in the cold formed layer. Tables 2 and 3 below illustrate the improvements in porosity and oxide inclusion count achieved by the present invention versus typical comparative powder-forged alloys.

TABLE 2

Typical porosity count in powder-forged
and invention powder metal alloys.

| Distance from Part Surface [mm] | Porosity Range [%] Powder-Forged | Porosity Range [%] Invention |
|---|---|---|
| 0 | 2-10 | 0 |
| 0.1 | 1-8 | 0 |
| 0.2 | 0.5-5 | 0 |
| 0.3 | 0.2-3 | 0 |
| 0.4 | 0-0.5 | 0 |
| 0.5 | 0 | 0 |

TABLE 3

Typical inclusion count in powder-forged
and invention powder metal alloys.

| Material | Inclusions/cm$^2$ >100 μm dia | Inclusions/cm$^2$ >150 μm dia |
|---|---|---|
| Powder-Forged | 0.83 | 0 |
| Invention | 0.0-0.1 | 0 |

The combination of tighter dimensional tolerances, improved surface finish and superior metallurgical microstructure results in an increased torque capacity for the one-way clutch. This surface finish improvement results in superior contact fatigue (spalling) resistance of the clutch race that in turn results in a higher torque capacity for a given clutch as indicated by preliminary results based on stroker testing of one-way roller clutches with powder forged races and races produced according to this invention.

Finally, another important cost advantage associated with this invention is the possibility of introducing machining operations (e.g., green drilling of radial lubrication holes) while the compact is in the green state (before sintering). Important cost savings result from the high cutting rates combined with very low tool wear. Green machining operations are not possible when the preform is forged.

THE DRAWINGS

These and other features and advantages of the present invention will become more readily appreciated when considered in connection with the following detailed description and appended drawings, wherein:

FIG. 4 is a schematic cross sectional view of an outer cam race and associated densifying tool;

FIG. 5 is a sectional view taken along lines 5-5 of FIG. 4;

FIG. 6 is a cross-sectional view of the inner clutch race and accompanying densifying tool;

FIG. 7 is a sectional view taken along lines 7-7 of FIG. 6;

DETAILED DESCRIPTION

Figure 1A:
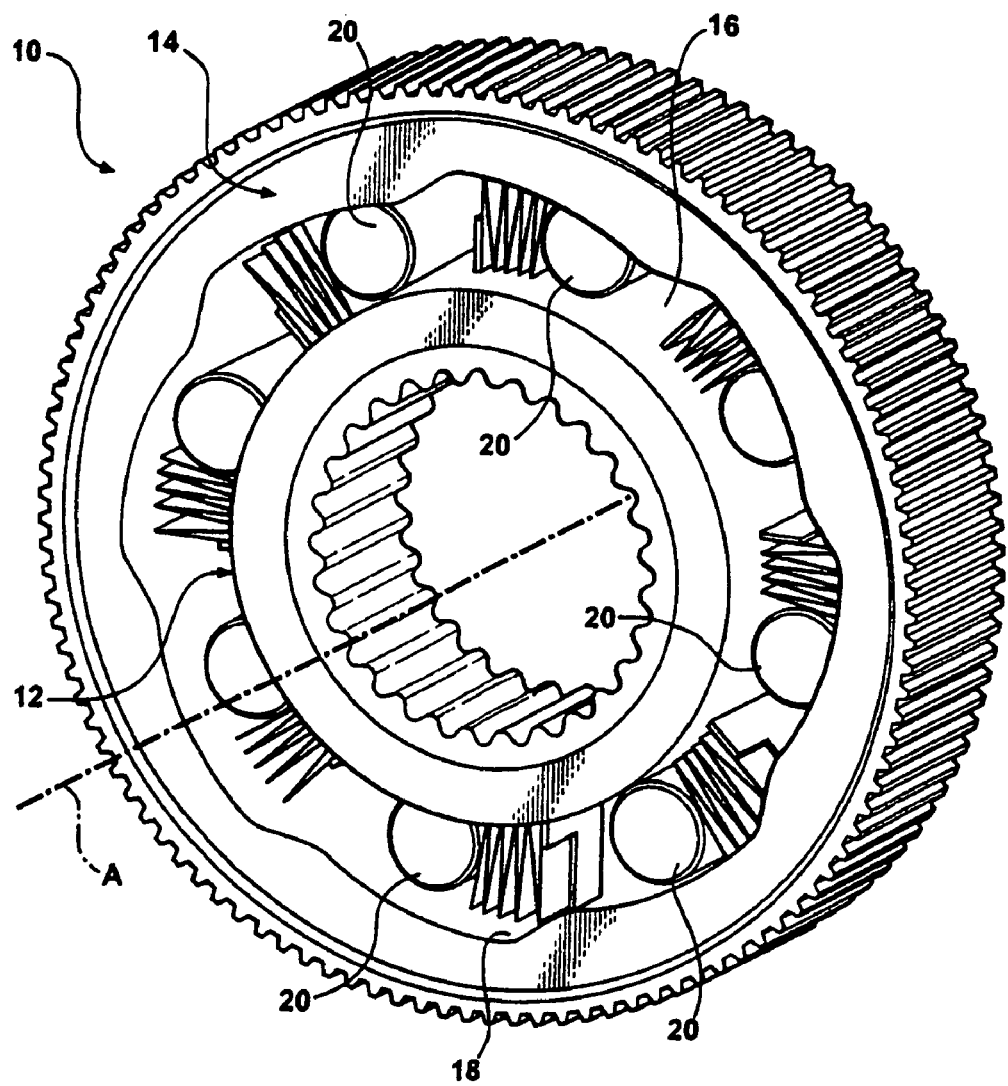
FIG. 1A is an isometric view exemplifying a one-way clutch of the roller type, having clutch race components fabricated according to the present invention.
Figure 1B:
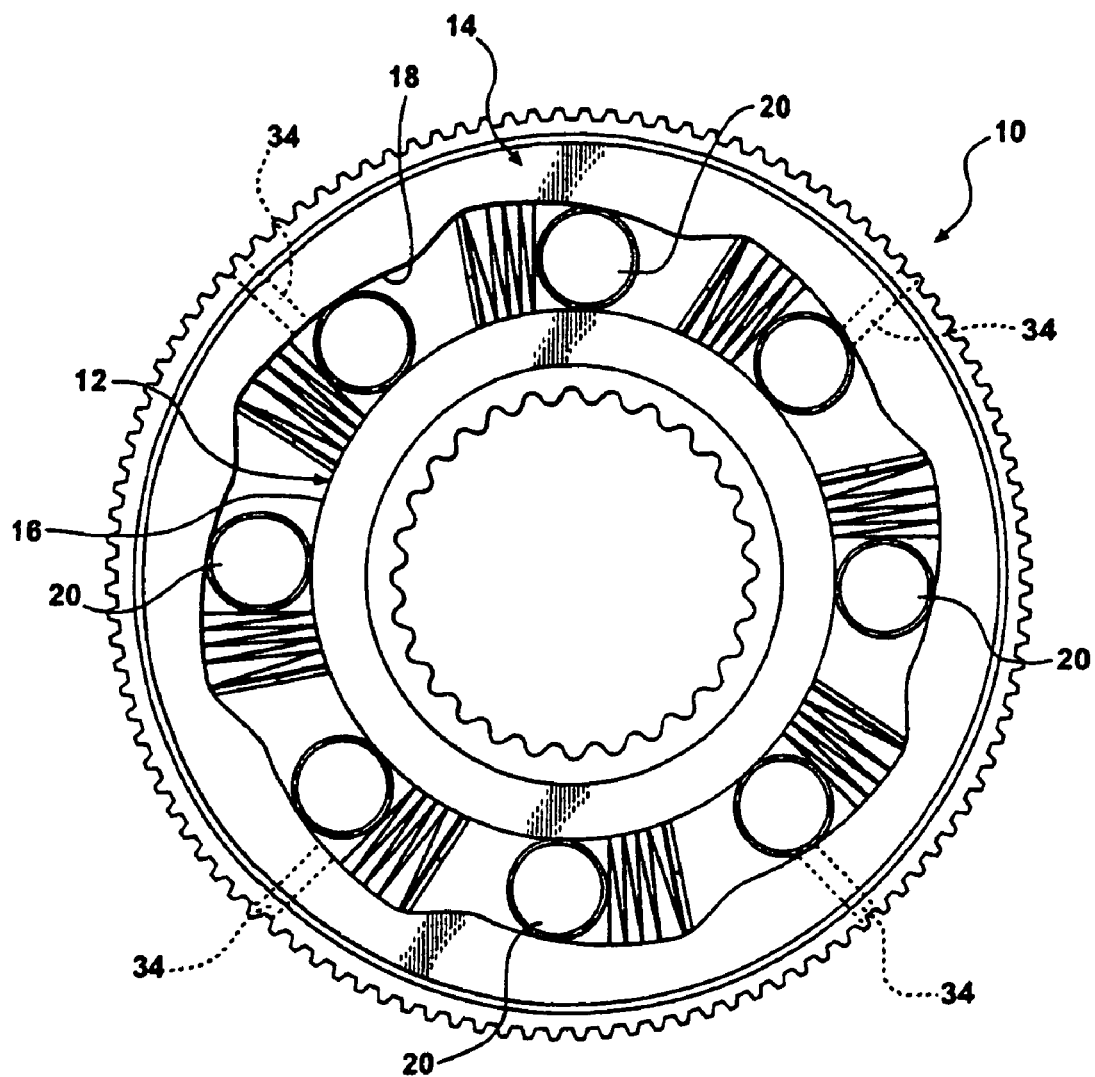
FIG. 1B is a cross-sectional view of the one-way clutch of FIG. 1 showing the presence of green-drilled radial lubricant holes in the cam surface.

FIGS. 1a and 1b show a representative roller one-way clutch mechanism 10 having an inner clutch race component 12 disposed about a central axis A and an outer clutch race or cam component 14 disposed concentrically about the inner clutch race component 12. The inner race 12 and the outer race or cam 14 have race surfaces 16, 18 that generally face one another and react in cooperation with one or more rollers 20 which enable the clutch races 12, 14 to rotate freely relative to one another in one direction while locking clutch races 12, 14 against reverse rotation. The general construction and operation of roller one-way clutches is well known to those skilled in the art and thus further details will not be given herein. Further details concerning the operation of such roller one-way clutch mechanisms can be found in reference 1.

Figure 2:
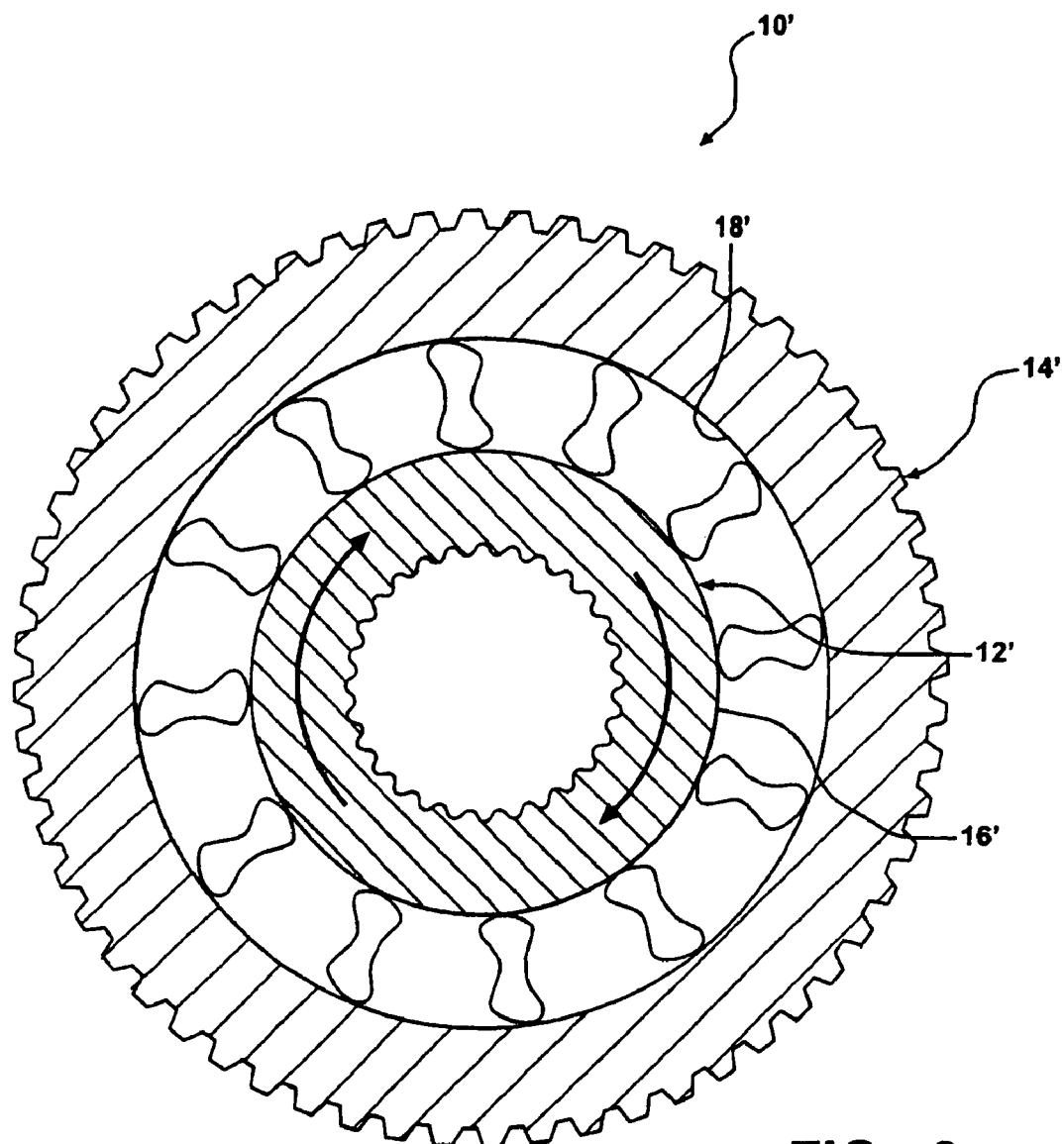
FIG. 2 is a cross-sectional view exemplifying a one-way clutch of the sprag type, having clutch race components fabricated according to the present invention.
Figure 3:
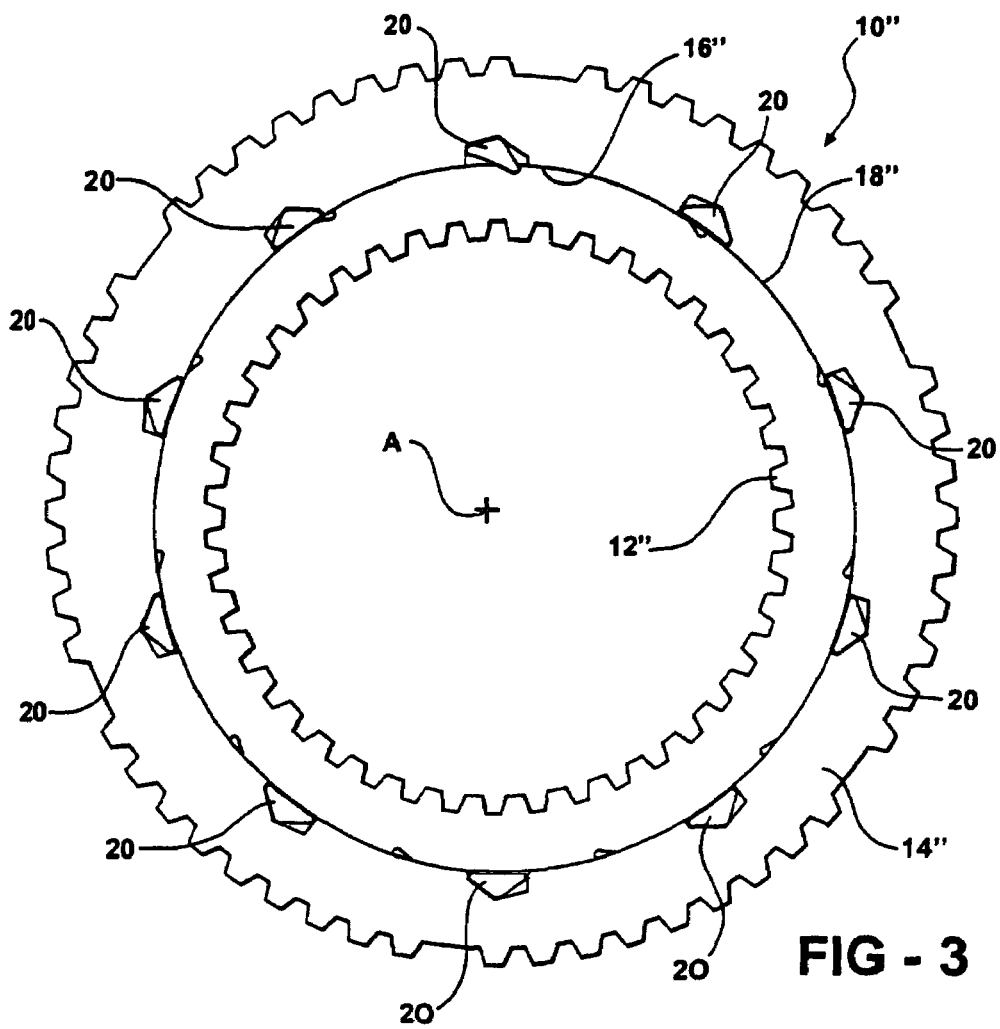
FIG. 3 is a cross-sectional view exemplifying a one-way clutch of the ratchet type, having clutch race components fabricated according to the present invention.

In addition to roller one-way clutch mechanisms of the type illustrated in FIGS. 1a and 1b, the invention further contemplates the manufacture of clutch races for other variety of one-way clutches, including sprag one-way clutches 10', illustrated in FIG. 2, wherein a plurality sprag elements react between the race surfaces to permit rotation in one direction but not in the opposite direction; and ratchet one-way clutches 10", illustrated in FIG. 3, wherein a plurality of pawl members react with an inner race with a plurality of notches and an outer race with a plurality of pockets surfaces to permit rotation in one direction but not in the opposite direction. Of course, the particular configuration the race surface of the inner and outer race 12, 14 will vary according to the particular type of one-way clutch depending upon the particular requirements of the application involved.

Turning now in more detail to the fabrication of the clutch races according to the preferred method of the invention, FIG. 4 shows a cross section through the outer clutch race or cam 14 which has been compacted and sintered to near-net shape from a ferrous-based powder metal, which could comprise either pre-alloyed steel powder, an admix of elemental iron powder and one or more alloy powder metal additions blended with elemental iron powder, or a combination of pre-alloyed and elemental iron powder with or without further additions of powder metal alloy constituents. The powder metal may also include graphite and appropriate machineability improvement additives, such as MnS, $CaF_2$ and the like. The invention is not intended to be limited to any particular iron based composition, so long as the material is suitable for use as a one-way clutch race.

By near-net shape it is meant that the compacted and sintered clutch race component 14 has been formed nearly to final shape after sintering and with the bulk of the powder metal being compacted and sintered to the final desired density for use in the clutch race application. The principal exception is the cam surface 18, which receives further cold working treatment described below to render it ready-to-heat-treat. Thus, following compaction and sintering, the outer clutch race 14 at the stage it is at in FIG. 4 has a core density of between about 6.8 and 7.6 g/cc (which equates to about 87-97% of full theoretical density of the material) which provides the necessary tensile fatigue strength and toughness for use in the desired clutch race application. The cam surface 18 also preferably has been formed in its compacted and sintered condition with a shape that closely approximates that of the final desired shape, although slightly undersized by a few tenths of a millimeter to accommodate subsequent further densification of the cam surface 18 to be described below.

The cam surface 18 of the near-net shape compacted and sintered outer clutch race component 14 is cold worked to form a densified layer 22 at the cam surface 18 in which the powder metal material in this layer 22 has a density exceeding that of the core density and a net shape final surface finish, such that no further machining of the cam surface 18 is needed beyond the cold working in order to put the outer clutch race 14 into use. The final surface preferably has a finish of 20 to 35 pinches. The densified layer 22 preferably has an essentially fully densified region (i.e., >99% of full theoretical density) to a depth of 0.2 to 1.5 mm, and more preferably between 0.35 to 0.8 mm. This highly densified thin layer 22 at the cam surface 18 backed by the strong but relatively less dense core 23 of the clutch race component 14 provides the necessary strength and toughness properties while providing the desired final shape, surface finish and contact fatigue resistance suitable for clutch race application.

Figure 8:
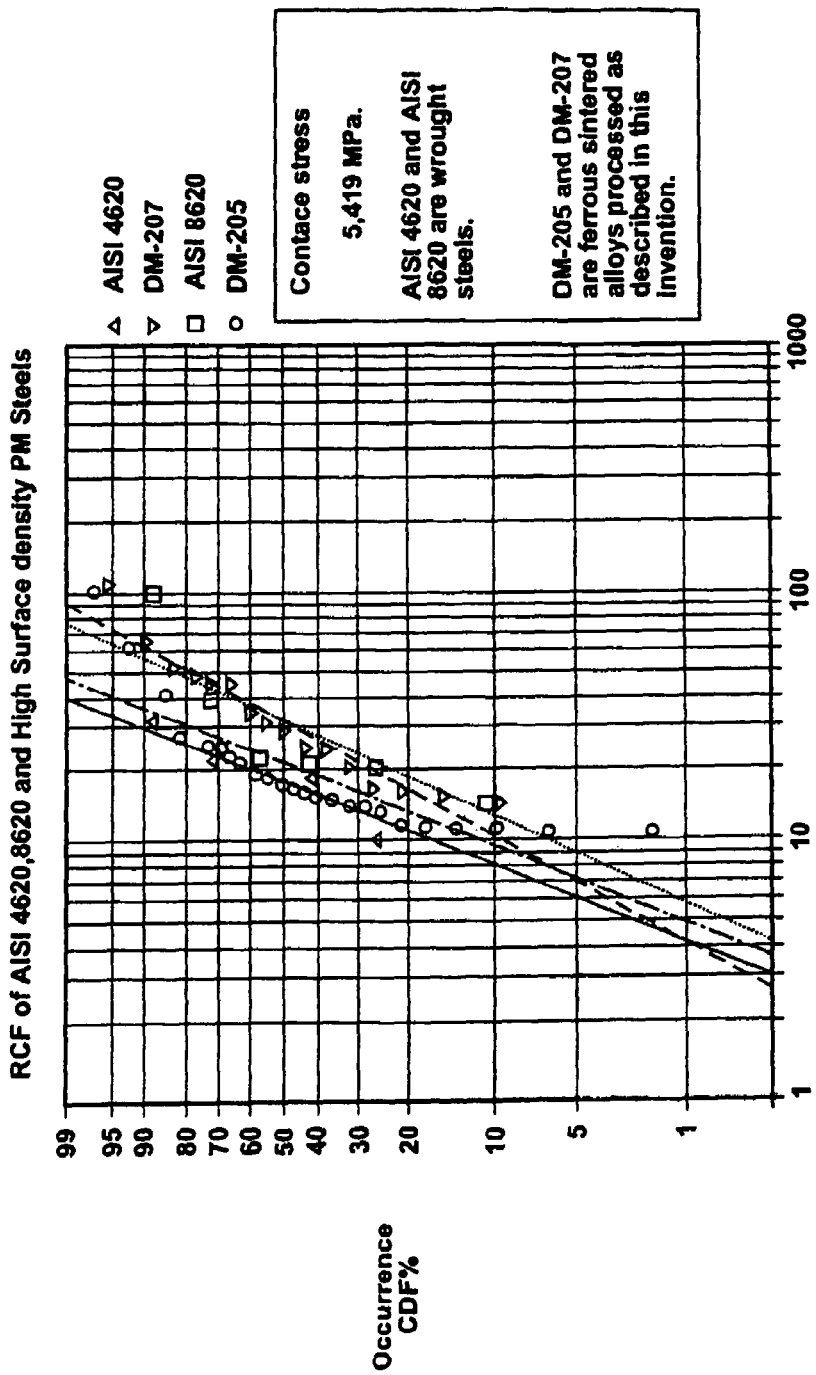
FIG. 8 shows a Weibull plot of the results of contact fatigue testing of wrought steels and ferrous sintered alloys produced according to the invention.

FIG. 8 plots the results from rolling contact fatigue testing of alloys manufactured according to the present invention, compared to high quality wrought bearing steels. The contact fatigue experiments were conducted in a ball-on-rod testing apparatus. The results are further summarized in Table 4 that shows that races manufactured according to the current invention match or exceed the contact fatigue strength of wrought steels as well as powder-forged alloys.

TABLE 4

B10 rolling contact fatigue life of invention, powder forged and wrought bearing steel alloys. Invention alloys are manufactured according to the process presented in the invention. Testing was conducted in a ball-on-rod apparatus.

| Material | B10 Life at 5419 MPa [$10^6$ cycles] |
|---|---|
| Invention DM-207 | 13.73 |
| Invention DM-205 | 9.65 |
| Wrought AISI 4620 | 8.12 |
| Wrought AISI 8620 | 10.17 |
| Forged FL-4680 | 2.47 |
| Wrought AISI 52100 | 6.7-9.3 |

Figure 9:
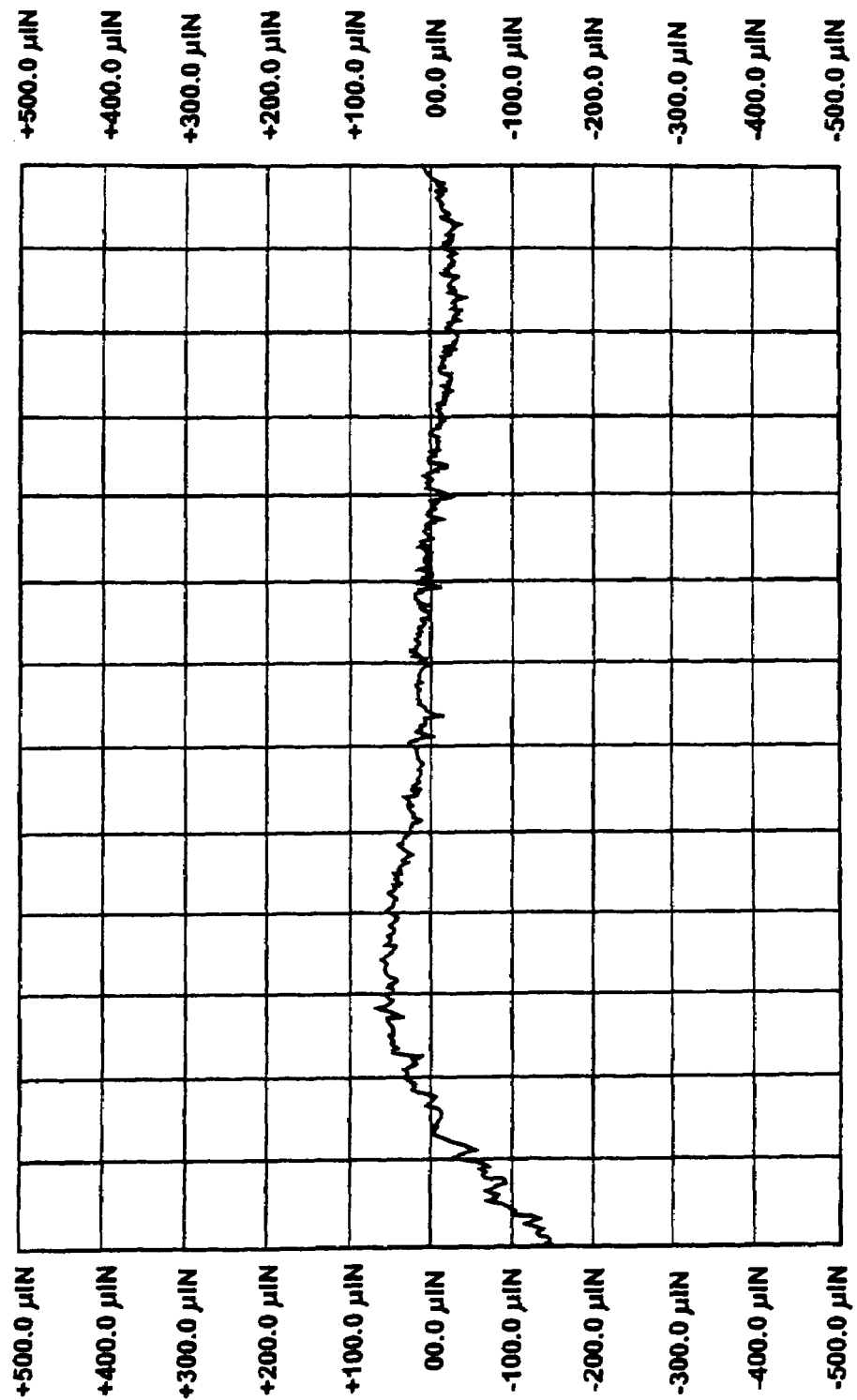
FIG. 9 is a typical plot of the surface finish measurement of a one-way clutch cam manufactured according to the method presented in the invention.
Figure 10:
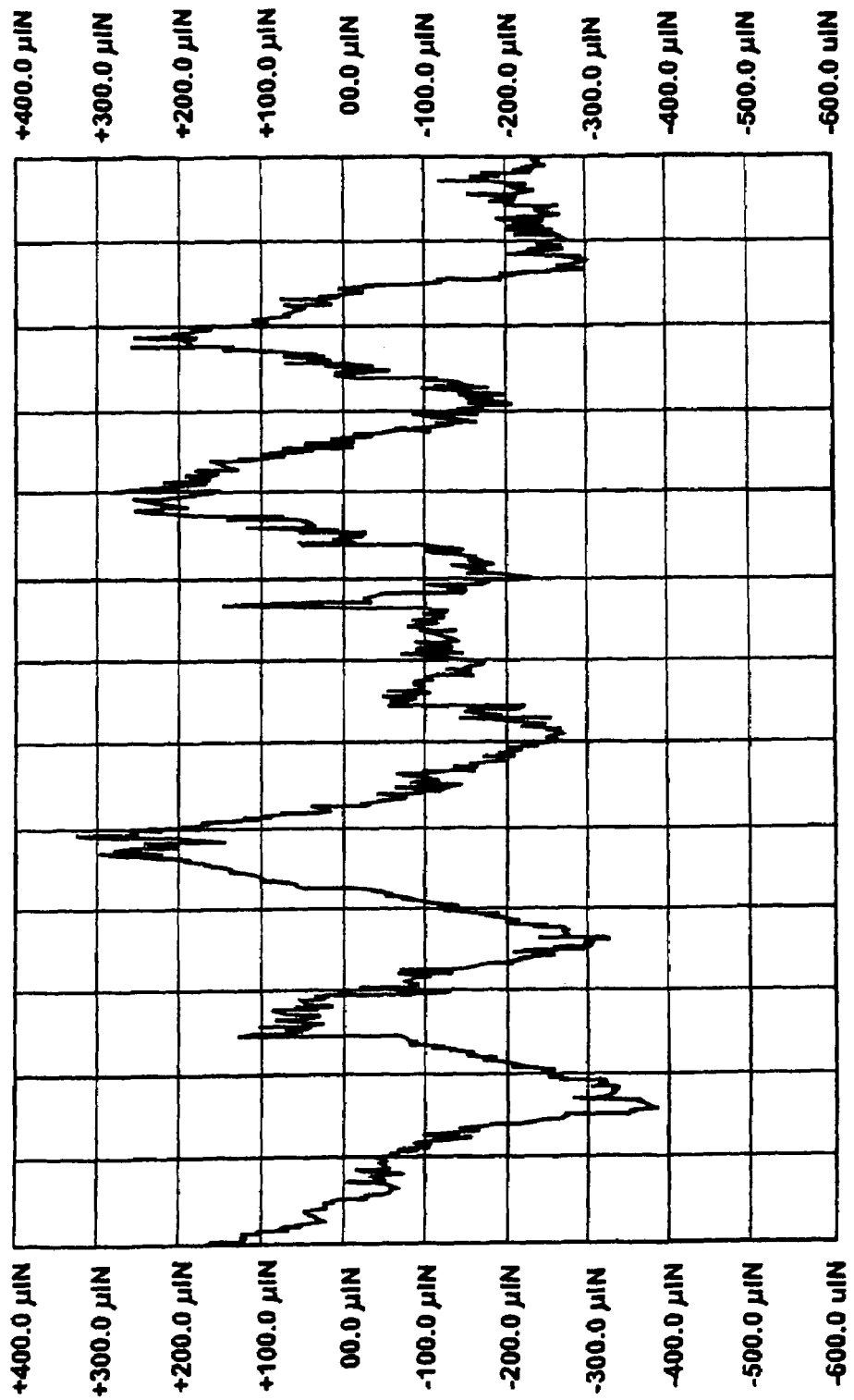
FIG. 10 is a typical plot of the surface finish measurement of a one-way clutch cam manufactured via powder forging.

The surface finish of the cam surface 18 following densification of layer 22 is in the range 20 to 35 pinches, and more preferably in the range of about 20 to 30 pinches. FIG. 9 illustrates a typical plot of the surface finish measurement of a one-way clutch cam manufactured according to the method presented in this invention. For comparison. FIG. 10 illustrates a typical plot of the surface finish measurement of a one-way clutch cam manufactured via powder forging.

The preferred method for densifying the layer 22 of the outer race 14 is to force a densifying tool 24 laterally across the cam surface 18, whereby the cam surface 18 encounters one or more forming portions 26a, 26b, 26c, etc. which further compact and density the surface to yield the densified layer 22 having the desired size and surface finish for end use. As shown in FIG. 5, the forming portions 26 are formed with the shape of the desired cam surface 18 although are somewhat undersized to achieve the desired densification of the layer 22.

Figure 11:
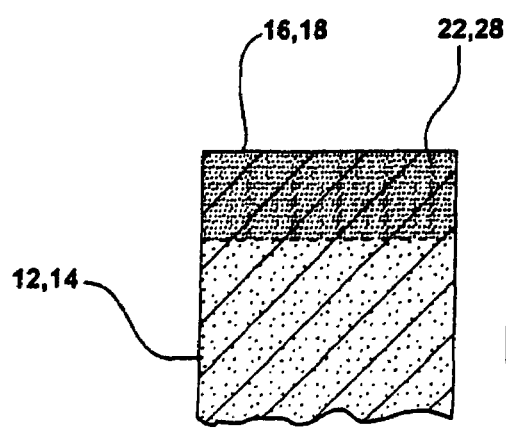
FIG. 11 is a schematic fragmentary sectional view of a cam race component according to the invention.
Figure 12:
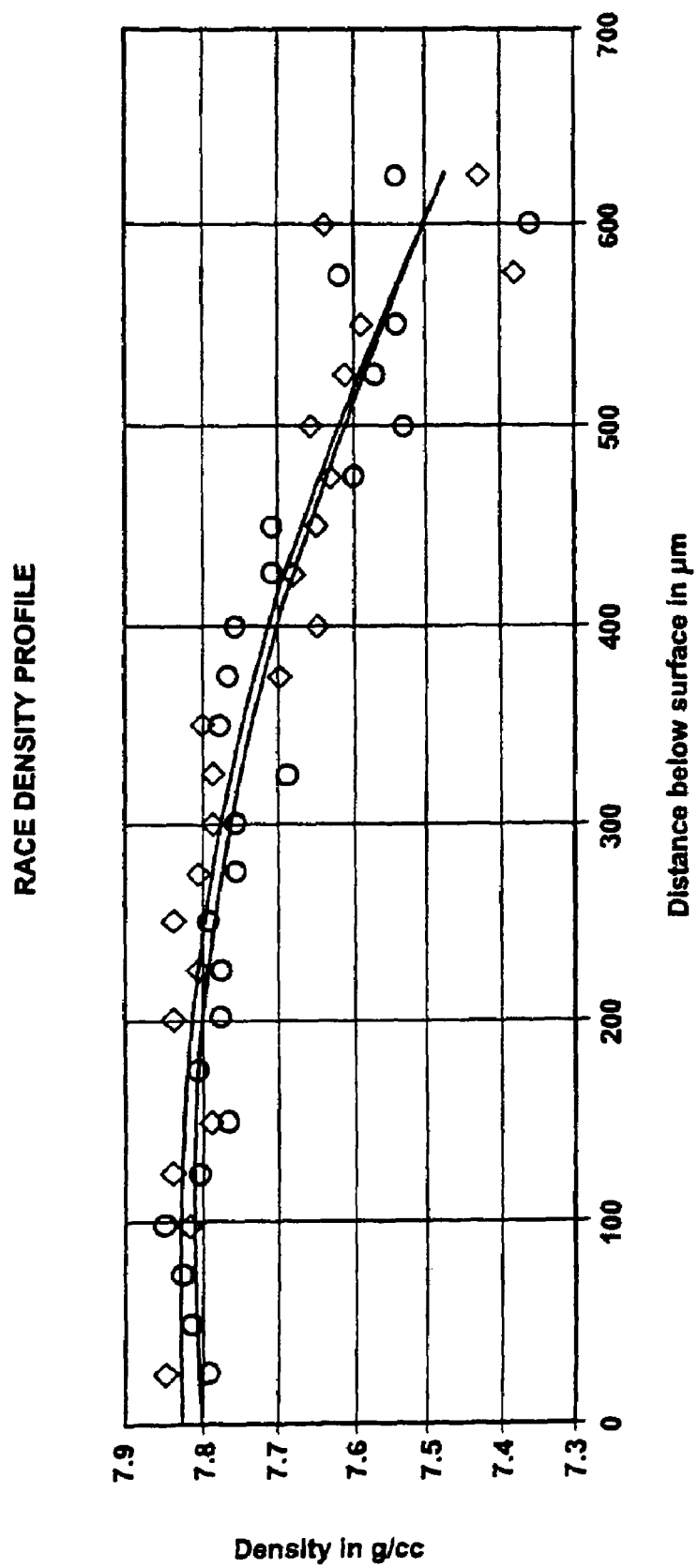
FIG. 12 illustrates the density profile at the surface of the race determined by image processing a micrograph of the densified layer.

The inner clutch race 12 is fabricated in the same general manner to yield a densified layer 28 at the race surface 16. Thus, the description above concerning the properties and fabrication of the outer clutch race 14 is equally applicable to the fabrication of the inner clutch race 12 and is incorporated herein by reference. Since the inner clutch race 12 has an outer cam surface 18, the densifying tool 30 used to produce the densified layer 28 is somewhat different than that used to density layer 22 of the outer clutch race 14 and is illustrated schematically in FIGS. 6 and 7. The tool 30 has one or more forming portions 32a, 32b, 32c, etc. which have the same general shape of the final race surface 16 to be produced for use in a one-way clutch application, although the forming portions 32a, 32b, 32c are slightly undersized to impart the densification to the layer 28. FIG. 11 is an enlarged fragmentary sectional view illustrating the resultant layer 22 or 28 developed on a race surface 16 or 18 of the inner or outer clutch race 12,14 backed by the core of the race having been compacted and sintered to a lesser core density than that of the layer as discussed above. FIG. 12 illustrates the density profile at the surface of the race. Densities were determined by processing the image of a micrograph of the densified layer.

FIG. 1b further illustrates the ability, according to the invention, for green machining of features in the preform prior to sintering. Illustrated are green-machined radial lubri-

What is claimed is:

1. A method of fabricating powder metal one-way clutch races, comprising:
preparing a ferrous-based powder metal;
processing the powder metal to near-net shape to yield a sintered one way clutch race component having a core density of between 6.8 and 7.6 g/cc and a race surface; and
cold working the race surface to form a cold worked layer at the surface having a density exceeding that of the core density and a final mean surface roughness Ra of between 20 and 35 μinches.

2. The method of claim 1 wherein the cold worked layer has a density exceeding about 99% of full theoretical density.

3. The method of claim 1 wherein the cold worked layer is formed by forcing a densifying tool laterally across the race surface.

4. The method of claim 1 wherein said surface comprises an HRC hardness of 55-60.

5. The method of claim 1 wherein said race surface comprises a localized density greater than that of said core density to a depth of 0.2-1.5 mm.

6. The method of claim 1 wherein said race surface has a localized density greater than that of said core density to a depth of 0.35-0.8 mm.

7. A method of fabricating powder metal one-way clutch races, comprising:
compacting ferrous-based powder metal to yield a green race preform;
machining features into the green race preform;
sintering the green race preform to produce a core density of between about 6.8 and 7.6 g/cc and a race surface; and
cold working the race surface to form a cold worked layer of the surface having a density exceeding that of the core density.

8. The method of claim 7 wherein said race surface comprises an HRC hardness of 55-60.

9. A method of fabricating powder metal one-way clutch races, comprising:
preparing a ferrous-based powder metal;
processing the powder metal to near-net shape to yield a sintered one-way clutch race component having a core density of between 6.8 and 7.6 g/cc and a race surface; and
cold working said race surface to form a cold worked layer at said race surface having a localized density exceeding that of the core density to a depth of 0.2-1.5 mm.

10. The method of claim 9 wherein said race surface has a localized density greater than that of said core density to a depth of 0.3-0.8 mm.

11. A method of fabricating powder metal one-way clutch races, comprising:
preparing a ferrous-based powder metal;
processing the powder metal to near-net shape to yield a sintered one-way clutch race component having a core density of between 6.8 and 7.6 g/cc and a race surface; and
cold working the race surface to form a discontinuous cold worked layer forming said race surface, said race surface having a localized density exceeding that of said core density.

12. The method of claim 11 wherein said race surface is an outer race of a one-way clutch.

13. The method of claim 11 wherein said race surface is an inner race of a one-way clutch.

14. The method of claim 11 wherein said race surface comprises an HRC hardness of 55-60.

* * * * *